United States Patent [19]
Hasegawa et al.

[11] 3,798,660
[45] Mar. 19, 1974

[54] AUTOMATIC FOCUSING DEVICE FOR CAMERAS

[75] Inventors: Goro Hasegawa, Tokyo; Yukio Iura, Yokosuka; Masayoshi Yamamichi, Sagamihara, all of Japan

[73] Assignee: Canon Kabushiki Kaisha, Tokyo, Japan

[22] Filed: Oct. 3, 1972

[21] Appl. No.: 294,519

[30] Foreign Application Priority Data
Oct. 11, 1971  Japan................................ 46-79982
Nov. 4, 1971  Japan................................ 46-87848

[52] U.S. Cl. ............................. 95/44 C, 95/10 C
[51] Int. Cl. ....................................... G03b 13/20
[58] Field of Search ........... 95/42, 44 R, 44 C, 10 C

[56] References Cited
UNITED STATES PATENTS
3,504,610  4/1970  Donitz.................. 95/44 R
3,713,371  1/1973  Kurihava et al........... 95/44 C
3,511,155  5/1970  Yamada................. 95/44 R
3,688,673  9/1972  Katsuyama............. 95/44 R Primary Examiner—Joseph F. Peters, Jr.
Attorney, Agent, or Firm—Flynn & Frishauf

[57] ABSTRACT

This specification discloses an automatic focusing device for cameras in which a mirror member is provided between a photographic optical system and a range finding optical system and the photographic optical system is moved by a servomotor while the mirror member is being moved up from its range finding position to its picture-taking position. Thereafter, the servomotor holds the optical system in the picture-taking position to accomplish picture-taking.

7 Claims, 10 Drawing Figures

AUTOMATIC FOCUSING DEVICE FOR CAMERAS

BACKGROUND OF THE INVENTION

1. Field of the Invention

This invention relates to an automatic focusing device for cameras, and more particularly to an automatic focusing device which uses the light beam that passes through the objective lens of the camera as a range finding light beam.

2. Description of the Prior Art

Various types of automatic focus device have heretofore been proposed in which the distance of an object to be photographed is photoelectrically detected to automatically focus an objective lens. In such conventional automatic focusing devices, a range finding optical system, e.g., for focusing the light from the object on a light receiving element, is provided in addition to a photographic optical system which is moved prior to and during picture-taking so as to be adjusted in accordance with the distance of the object to be photographed. However, if a parallax is present because of the relative offset of the photographic and range finding optical systems, the object aimed at by the photographic optical system will not be in accord with the object aimed at by the range finding optical system, thus failing to accomplish accurate focusing with respect to the object to be photographed. Further more, replacement of the objective lens in an interchangeable lens fashion must involve replacement of the range finding optical system, otherwise accurate range finding could not be achieved because of the difference in focusing scale of the lenses, as well as the parallax.

SUMMARY OF THE INVENTION

It is an object of the present invention to overcome the above-described disadvantages of the prior art by using a photographic optical system also serving as a range finding optical system and adjust the photographic optical system in a range finding operation carried out prior to the picturetaking operation. In the present invention a mirror member is provided between the photographic optical system and thr range finding optical system. The photographic optical system is subjected to focusing movement by a servomotor while the mirror is being flicked from a first position for the range finding purpose to a second position for the picturetaking purpose, after which the servomotor holds the photographic optical system in the second position to accomplish picture-taking. More specifically, according to a feature of the present invention, a movable mirror is provided between the photographic lens system and a range finding light receiving element so that the photographic lens system is adjusted by a servomotor in accordance with the output of the light receiving element determined with the mirror placed in its first position for the range finding operation. The servomotor is stopped in response to the movement of the mirror from the first position to the second position for picture-taking, thereby accomplishing picture-taking with the photographic lens fixed in the range finding position irrespective of the interruption of the object light to the light receiving element.

BRIEF DESCRIPTION OF THE DRAWINGS

The invention will become fully apparent from the following detailed description of various embodiments thereof taken in conjunction with the accompanying drawings, in which.

DESCRIPTION OF THE PREFERRED EMBODIMENTS

Figure 1:
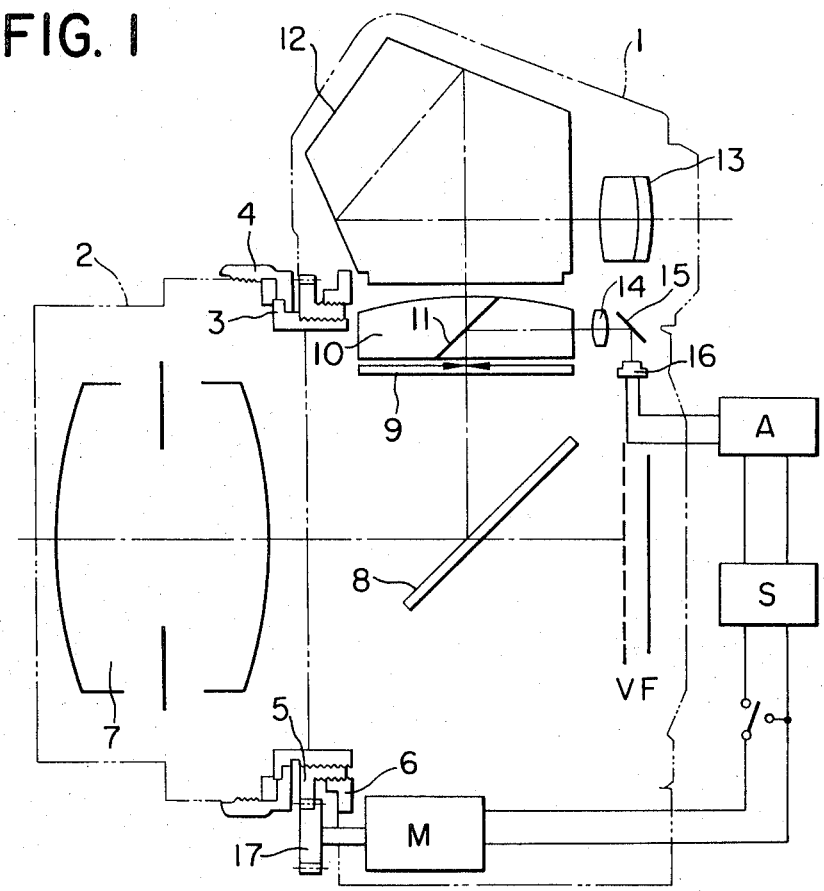
FIG. 1 schematically shows the construction of a single lens reflex camera to which the automatic focusing device of the present invention is applied.

FIG. 1 schematically shows, in side elevation, the optical path of a single lens reflex camera with an interchangeable lens and an automatic focusing device incorporated within the camera. The camera includes a camera body 1, a body tube 2, an interchangeable lens mounting member 3 attached to the camera body 1, a releasably mounting member 4 attached to the body tube 2, a rotatable ring 5 internally and externally threaded and having a gear-like outer surface, a ring 6 secured to the camera body and provided with a threaded portion meshing with the ring 5, an objective lens 7, a mirror 8, a focusing screen 9, a condenser lens 10, a half-mirror 11 for splitting the center light beam passed through the condenser lens 10 into upward and rightward directions, a pentaprism 12, an eyepiece 13, a lens 14 for projecting the image on the focusing screen onto a photocell 16, and a mirror 15 for bending the light path. Although the mirror 15 is shown to direct the light downwardly, it may be designed to direct the light in a direction perpendicular to the plane of the drawing sheet so that the device may readily be incorporated in the camera without sacrificing the dimensions of a focal plane shutter, film chamber, etc., for example. The output of the photocell 16 may be applied through an amplifier circuit A and through a control circuit S including a voltage source to a drive means M, which drives a gear 17 until the power transmission to the gear portion of the rotatable ring 5 is stopped at a proper position.

As shown in FIG. 1, an object image may be passed through the objective lens 7 and projected by the mirror 8 onto the focusing screen 9, and when the mirror is moved up and the focal plane shutter V opened, the image is focused on a film F. By the half-mirror 11 provided within the condenser lens 10, the light passed through the focusing screen 9 may be directed rightwardly in the condenser lens, and further passed through the lens 14 and via the mirror 15 so as to be focused on the photocell 16.

Figure 4:
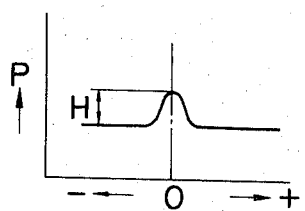
FIG. 4 shows the AF circuit applied to the camera of FIG. 3.

On the other hand, the lens tube 2 is adapted to be coupled to the mounting member 3 by means of the releasably mounting member 4. The mounting member 3 is threadably engaged with the rotatable ring 5. Rotation of the drive means M may cause rotation of the gear 17 which may in turn rotate the rotatable ring 5. While rotating, the rotatable ring 5 may be moved along the optical axis under the control or unshown guide. Thus, the lens tube 2 may be driven along the optical axis in response to the rotation of the drive means M.

Where the photocell 16 is formed of CdS, for example, a difference in the resistance value as the output of the photocell will present itself, as shown in FIG. 4, between the position in which the formed image on the CdS surface is in focus and the position in which the image is out of focus. During the in-focus position the drive means M is inoperative, whereas during the out-of-focus position the drive means M is operative to move the lens tube 2 until the resistance value of the CdS reaches its extreme value, whereupon the output thereof is amplified by the amplifier circuit A to deenergize the drive means M by the control circuit S, thereby effecting the focusing.

Of course, it is also possible to provide a plurality of photocells and use a servocircuit to control the lens position and design a main switch to be opened upon upward movement of the mirror.

Figure 2:
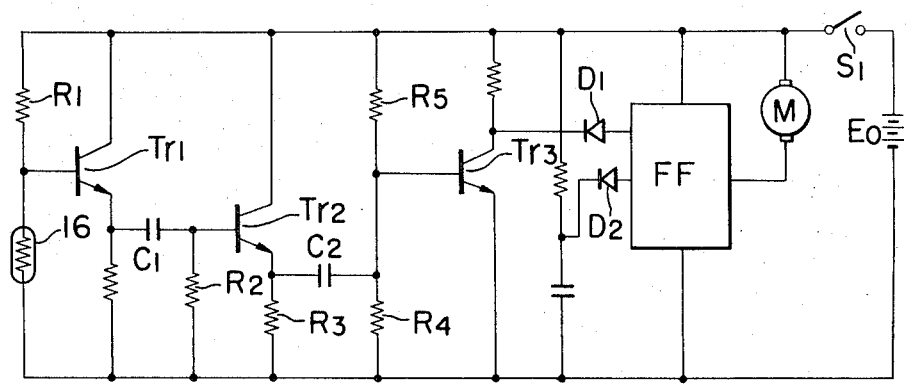
FIG. 2 is a diagram showing the automatic focusing control circuit (hereinafter referred to as AF circuit) applied to the camera of FIG. 1.

FIG. 2 shows the AF circuit in the camera of FIG. 1. The circuit includes a resistor R1 cooperable with the photocell 16 to provide a voltage divider, transistors Tr1 and Tr2 for detecting the extreme value of the photocell, coupling capacitors C1 and C2, and circuit resistors R2, R3, R4 and R5. Further included are a switching transistor Tr3, diodes D1 and D2, flip-flop circuit FF, motor M for driving the objective lens, voltage source $E_0$ and main switch S1.

In FIG. 1, when the lens 7 does not focus an object image on the film surface F, the object image is likewise not focused on the photocell 16, which is provided in conjugate relationship with the film surface F, the lens 14 being interposed therebetween. When the switch S1 is closed, the flip-flop FF is set to energize the motor M. The resistance value of the cell 16 is greater during the out-of-focus condition, but when the focused condition is reached, the resistance of the cell 16 presents a minimum value to render the transistors Tr1, Tr2 and Tr3 conductive and thus reset the flip-flop FF, thereby deenergizing the motor M. In the manner described above, the motor M moves the objective lens 7 into its focused position, whereafter it is deenergized and such position is maintained by the flip-flop. Subsequently, upon shutter release operation, the mirror is moved up, by unshown mirror driving mechanism, to intercept the object image to the cell 16, whereas upon the motor M is maintained in deenergized condition by the flip-flop FF so that the objective lens is not displaced. In response to the upward movement of the mirror, the shutter is opened and closed to accomplish picture-taking.

Figure 3:
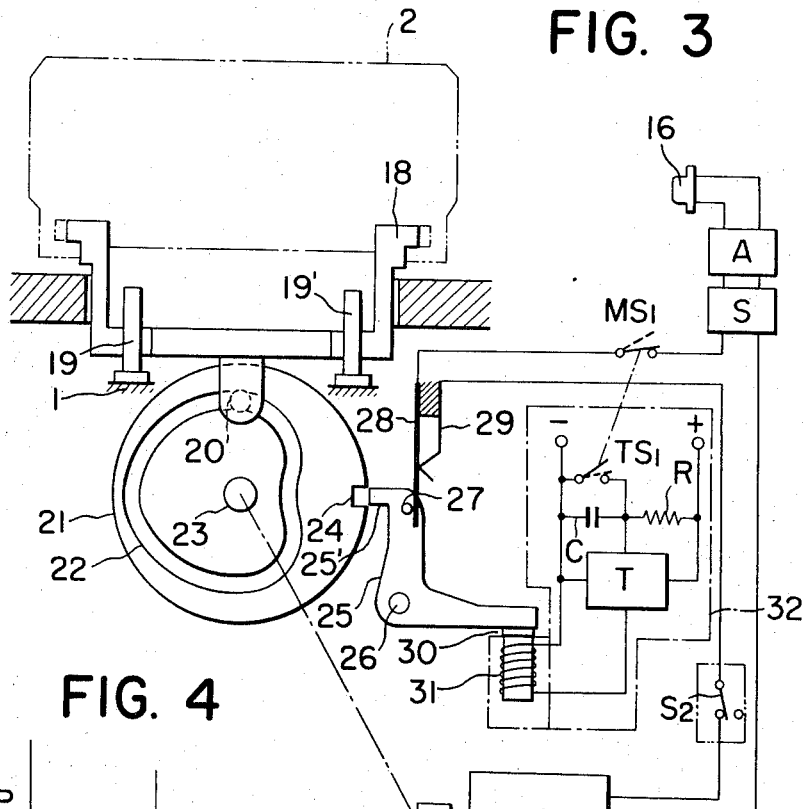
FIG. 3 is a schematic view showing the essential portions of the single lens reflex camera according to a modification of the present invention.
Figure 5:
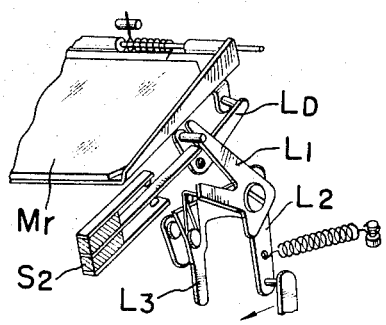
FIGS. 5 and 6 show the contruction of the changeover switch used with the camera of FIG. 3.
Figure 6:
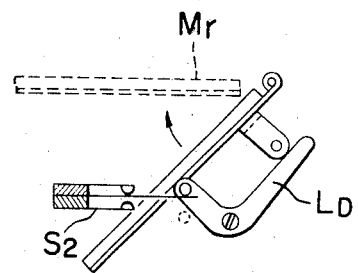

FIG. 3 shows another embodiment of the present invention which includes a lens mounting member 18 of the camera body 1, guide pins 19 and 19' securely mounted to the camera body 1 for guiding the mounting member 9 along the optical axis, a lens driving pin 20 secured to the mounting member 18, and a rotary disc 21 provided with a camming groove 22 for driving the pin 20 and mounted on a shaft 23, the disc 21 being further provided with a notch 24. A lever 25 having a pawl 25' formed at one end thereof is pivotally mounted on a shaft 26. The lever 25 has an insulating pin 27 studded therein. Contact springs 28 and 29 together form a switch. An iron piece 30 is secured to the lever 25 at the other end thereof for cooperation with an electromagnet 31. A time constant circuit 32 is provided which includes a resistor R, a capacitor C, a trigger switch T and a count-starting switch TS1, and an unshown voltage source is connected with the circuit 32. A switch S2 is provided and adapted to be opened and closed by a lever LB operatively associated with a mirror quick-return mechanism comprising drive levers L1, L2 and L3, as shown in FIGS. 5 and 6. The switch S2 is opened in response to initial movement of the mirror. The count-starting switch TS1 for the time constant circuit 32 may be opened and closed in response to the movement of main switch MS1.

In FIG. 3, the lens mounting member 18 of the camera body 1 is controlled for movement only along the optical axis by the guide pins 19, 19' secured to the camera body 1. The lens driving pin 20 secured to the lens mounting member 18 is engaged in the camming groove 22 of the disc 21. The disc 21 is rotatable about the shaft 23, and the lift of the pin 20 thereon is selected so as to provide a characteristic corresponding to the lens focusing system within the adjustable focus range.

The notch 24 formed in the disc 21 may be engaged by the pawl 25' of the lever 25. The relative position between the notch 24 and the cam 22 is selected for desired adjustment so that when the pawl 25' is received in the notch 24 the lens mounting member 18 is moved to a specific intermediate point within the adjustable focus range, such as over-focal point or infinity point.

Figure 7:
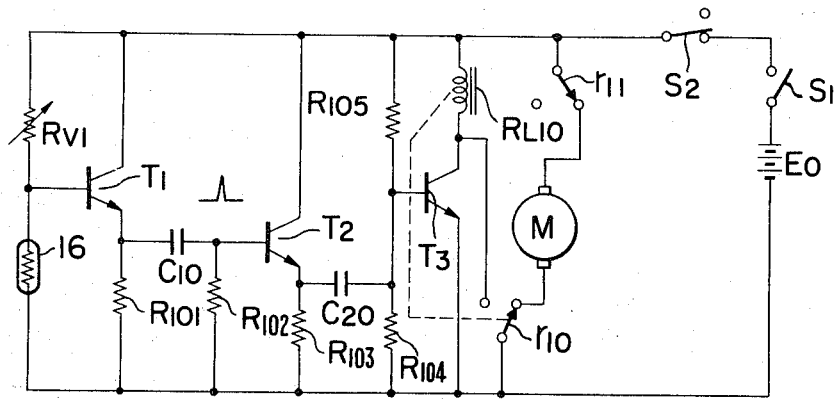
FIG. 7 diagrammatically shows the AF circuit of the FIG. 3 camera.

The AF circuit in the block diagram of FIG. 3 is more particularly shown in FIG. 7. It includes a variable resistor RV1 connected in series with the photocell 16, transistors T1–T3 for detecting the extreme value of the cell 16, coupling capacitors C10 and C20, resistors R101–R105, and a relay RL10 connected with the collector of the transistor T3 and having contacts r10 and r11 connected in the drive circuit for motor M. S2 and S1 are a mirror-associated switch and a main switch, respectively, and $E_0$ designates a voltage source. When the mirror Mr (FIG. 5) is lowered to a viewfinder image observing position, the switch S2 is closed and the contacts r11 and 410 of the relay RL10 close the motor M drive circuit to energize the motor M, which thus displaces the objective lens 2 along the optical axis by means of the cam 21. When the object image is focused on the cell 16, the relay R10 is energized to change over the self-hold relay r10 so as to self-hold the relay R10, while the contact r11 is opened to deenergize the motor M, thus stopping the lens 2. Upon shutter release, the switch S2 is opened in response to the movement of the mirror Mr so that the relay RL10 is deenergized to open the contact r10 and close the other contact r11. However, the switch S2 remains open during the picture-taking operation, thereby maintaining the motor M in its position for focusing. Upon completion of the picture-taking operation, the mirror Mr returns to its initial position to close the switch S2 and resume the automatic focusing operation.

The sequence of operation will now be described. When the main switch MS1 is closed in the position as shown in FIG. 3, the drive means M is not energized by the output of the photocell 16 if the object image is focused on the photocell, but the drive means is energized if the object image is not focused on the photocell, thereby rotating the disc 21 to cause its camming groove 22 to move the lens tube along the optical axis with the lens mounting member 18.

When the object image becomes focused on the photocell 16, the drive means M is deenergized. Upon shutter release, the switch S2 is opened before the film is exposed, thus maintaining the drive means M deenergized during the picture-taking operation. Where the object distance is too short to establish an operative association or the contrast of the image is too low to enable the detection of the focus, no output signal could be produced from the photocell 16 even if the disc made one or more rotations with the main switch MS1 closed, and accordingly the drive means M would continue to be operative.

To avoid this, the time constant circuit 32 is provided. The switch TS1 is opened in response to the closing of the main switch MS1, and the resistor R and capacitor C are set so that the electromagnet 31 releases the iron piece 30 when the time required for one rotation of the disc 21 has passed. Therefore, even if the drive means M remains energized with no stop signal applied thereto after one or more rotations of the disc 21, the time constant circuit 32 will be operative after a predetermined time, thereby deenergizing the electromagnet so as to release the iron piece 31. Thus, the lever 25 is rotated counter-clockwise about the shaft 26 by the force of the contact spring 28 so that the tip end of the pawl 25' is brought into contact with the periphery of the disc 21, while the disc 21 continues its rotation because the contacts 28 and 29 are in engagement with each other. As the notch 24 reaches registry with the pawl 25', further counter-clockwise rotation of the lever 25 causes the pawl 25' to be received in the notch 24, to stop the rotation of the disc 21 on the one hand and open the contacts 28 and 29 on the other hand, thus deenergizing the drive means M.

This stop position corresponds to a position in which the object image is substantially formed on the film, and it is thus ensured that photography can be accomplished without an extremely out-of-focus condition and that the drive means M can be deenergized after a predetermined time.

Figure 8:
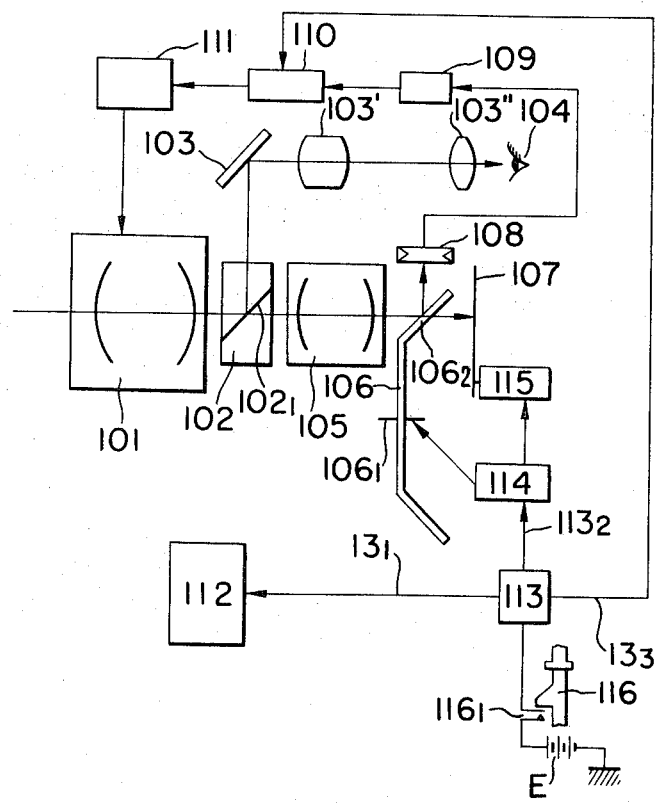
FIG. 8 schematically shows the device of the present invention as applied to a cinecamera.

FIG. 8 shows a modified embodiment of the present invention. It includes an objective lens 101, a beam splitter 102 comprising two joined prisms with a half-mirror attached to the interface therebetween, a total reflection mirror 103 disposed in the viewfinder's optical path provided by the beam splitter 102, viewfinder's image forming lenses 103' and 103'' through which a photographer's eye 104 can view, an image forming lens 105 cooperating with the lens 101 to form an image forming optical system, and a mirror shutter 106. As more particularly shown in FIG. 9, the mirror shutter 106 comprises a rotatable mirror $106_2$ and a cutaway portion $106_3$, the mirror $106_2$ having its peripheral margin leveled or reverse-dished at 45° and having the surface thereof treated for total reflection. The mirror shutter 106 is securely carried on a rotary shaft $106_1$ driven by a motor shaft which will later be described. The mirror shutter acts to time-divide the object light passed through the lenses 101 and 105 in such a manner that the mirror surface $106_2$ intersects the light beam to the film surface when the mirror surface $106_2$ is brought into confronting relationship with a light receiving element to be described, and that the light beam is applied to the film surface when the cutaway portion $106_3$ is brought into confronting relationship with the surface of the light receiving element. Thus, the object light may be time-divisionally applied to the light receiving element and the film surface. The sensitive film, designated by 107, is disposed behind the mirror shutter 106 and carried and fed by an unshown film guide. A photoelectric converter element 108, such as a photocell, is disposed in opposed relationship with the total reflection surface $106_2$ of the mirror shutter 106 and in optically equidistant relationship with the film 107. The photocell 108 is connected with an automatic focus detecting circuit 109, which in turn is connected with a gate circuit 110 whose output time-divisionally drives a drive motor 111 for lens 101. There are further provided an oscillator 113, a synchronous motor 114 for driving the mirror shutter, an auxiliary light source 112 such as strobe synchronously flashing in response to the output from the oscillator 113, and a film feed driving mechanism 115.

The oscillator circuit produces a single pulse from an output $113_1$ thereof as soon as the light receiving element 108 is confronted by the mirror $106_2$ of the mirror shutter 106, and also the oscillator circuit applies a continuous pulse train from another output $113_2$ to the shutter drive motor 114 and further to the film feed mechanism 115, thereby continuously rotating the shutter 106 at a predetermined speed while intermittently feeding the film 107 as long as the mirror portion $106_2$ of the shutter 106 confronts the light receiving element 108. From a third output $113_3$ of the oscillator 113 there is further produced a gate pulse which is applied to the gate circuit 110. Such gate pulse applied as input to the gate circuit 110 is of a pulse width which is continuous as long as the mirror portion $106_2$ is confronting the light receiving element 108 during rotation of the shutter 106. A shutter release button, designated by 116, causes a main switch $116_1$ to be closed during shutter release, thus connecting the oscillator 113 with an operating voltage source E. Such an oscillator may be a conventional one and its construction need not be described any further.

In the above-described circuit arrangement, the automatic focus detecting circuit 109 may be such a known one as disclosed in applicant's Japanese Pat. Publication No. 13669/1966 or No. 14501/1966 wherein two light receiving elements 108 are disposed before and behind the focal plane so that the outputs of the two elements are utilized for operation.

In operation, the release button 116 is depressed with the lens 101 looking toward an object, whereby the switch $116_1$ is closed to operate the oscillator 113.

Figure 9:
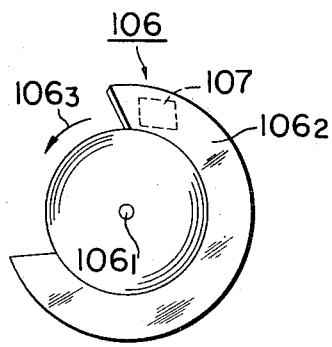
FIG. 9 shows the construction of the shutter in the camera of FIG. 7.

The shutter 106, which is provided with a retaining mechanism of the known type used with the shutter blade mechanism in a cinecamera, is normally stopped at the specific position as shown in FIG. 9 for shielding the film 107 from light by means of the mirror portion $106_2$. Therefore, when the unshown retaining mechanism is released by means of the release button 116, the motor 114 starts to be rotated in the direction of arrow by the output $113_2$ of the oscillator 113. With the rotation of the shutter 106, the light receiving element 108 receives the object light beam passed through the lenses 101 and 105 and via the mirror portion $106_2$, and converts such light into an electrical signal for operating the automatic focusing circuit 109. When the gate circuit 110 is being opened by the gate pulse from the oscillator circuit output 113₃, the lens driving motor 111 is driven by a control signal from the circuit 109 to move the lens 101 over a predetermined amount, so that the object image is formed on the light receiving element 108.

In the meantime, the mirror shutter 106 continues its rotation to apply the object light beam to the light receiving element 108 via the mirror surface 106₂ of the shutter 106 until the above-described automatic focusing operation is completed. At the same time, the oscillator circuit triggers the auxiliary light source 112, which thus flashes to intensify the object light beam enough to ensure a predetermined beam of object light to impinge on the light receiving element 108 irrespective of any low brightness of the object.

During that while, the film 107 is advanced one frame by the intermittent feed mechanism and then remains stopped. As the mirror shutter is further rotated to allow the cut-away portion 106₃ to expose the film 107 to light therethrough, no object light is now received by the light receiving element 108, which thus produces a predetermined level of output, whereas the motor 111 remains unenergized to permit the film surface 107 to be exposed to the object image because the gate circuit 110 is closed by the gate signal from the oscillator circuit 113.

As the mirror shutter 106 further rotates to bring the mirror surface 106₂ thereof again into confronting relationship with the light receiving element 108, the automatic focusing circuit 109 again drives the motor 111 to move the lens 101, as described above, so as to focus the object image on the film surface, whereafter the mirror surface 106₂ is again displaced from the confronting position to the position ready for photography to be effected through the cut-away portion 106₃. Even if the object is displaced during that while, the lens 101 may be adjusted at each automatic focusing operation in accordance with the displacement of the object because the mirror shutter 106 is continuously rotating to perform the automatic focusing of the objective lens and the exposure sequentially and instantaneously in time-divisional fashion.

Thus, according to the present invention, the time divisional occurrence of the automatic focusing operation and the picture-taking operation ensures accurate focusing to be achieved independently of displacement of the object to be photographed. Also, by causing the auxiliary light source to flash in synchronism with the time-division signal, the above-described result can be expected even for an object of extremely low brightness, and this is highly effective as automatic focusing device.

Figure 10:
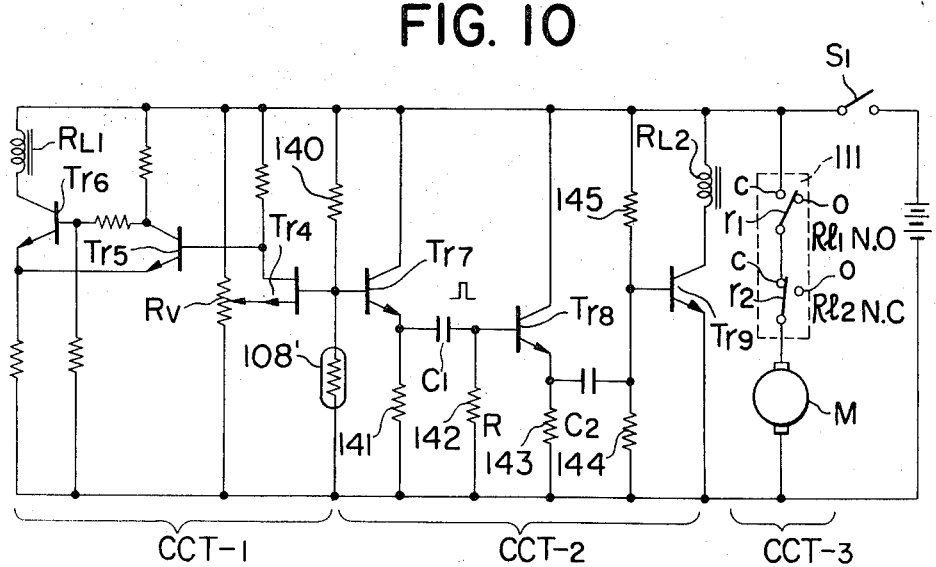
FIG. 10 is a diagram showing the AF circuit used in the camera of FIG. 7.

FIG. 10 shows a modification of the AF circuit 109, 110, 111 shown in FIG. 8, one which employs a simple relay circuit. It includes a shutter position signal generating circuit CCT-1 corresponding to the gate circuit 110, an extreme value detecting circuit CCT-2 corresponding to the AF circuit 9, and a drive circuit CCT-3 for servomotor M. In these circuits, a resistor 140 cooperates with a cell 108' to constitute a voltage dividing circuit, and switching transistors Tr4, Tr5 and Tr6 are provided. The switching transistor Tr4 is connected with the output of a bridge circuit formed by resistor 140, cell 108' and variable resistor Rv. A relay RL1 is connected with the collector of the transistor Tr6. The extreme value detecting circuit C2 comprises transistors Tr7, Tr8 and Tr9, coupling capacitors C1 and C2, resistors 141-145 and relay RL2. The contacts operated by the contact arms r1 and r2 of the relays RL1 and RL2, respectively, are connected in the drive circuit for motor M.

In the embodiment of FIG. 10, no such means as pulse oscillator 113 of FIG. 8 is used and the shutter 106 and film 107 are driven by a known drive mechanism. When the light receiving element 108' receives the light reflected by the mirror portion 106₂ of the rotating shutter 106, the relay RL1 is energized to shift the contact r1 thereof to the C position. As a result, the servomotor M moves the objective lens. When the object image is formed on the light receiving element with the movement of the objective lens, the extreme value detecting circuit C2 is opened to energize the relay RL2, whose contact r2 is thus changed over to the O position, thereby deenergizing the motor M. Since the shutter 106 is rotating, the film 107 is exposed to the object light through the cut-away portion 106₃. As long as such exposure is occurring through the opening 106₃ of the shutter 106, no object light impinges on the light receiving element 108' so that the relay RL1 is unenergized to open the contact r1 thereof, whereby the motor M is deenergized during the exposure operation and the objective lens is maintained stationary. Thus, the range finding operation and the exposure operation occur successively with the rotation of the shutter in such a manner that during the exposure operation the objective lens is held in its adjusted position obtained as the result of the range finding operation.

As described hitherto, according to the present invention, the focused condition of the object image produced by the objective lens may be detected by the light receiving element in order to move the lens and then, during picture-taking operation, the lens is held at its adjusted position so as to permit the picture-taking and automatic focusing operations to occur in the time-divisional fashion. Thus, the automatic focusing operation can be accomplished to great advantage with a very high accuracy by the use of the light beam that passed through the objective lens.

We claim:

1. A photographic camera provided with an automatic focusing device, comprising:
   a photographic optical lens system including an objective lens;
   a mirror member provided between said objective lens and a sensitive film surface;
   drive means drivingly connected with said mirror member for driving said mirror member between a first position for intercepting light directed from said objective lens to the film surface and a second position in which light directed to said film surface is not intercepted;
   a range finding light-receiving photoelectric element disposed in conjugate relationship with the film surface and disposed to receive light intercepted as aforesaid when said mirror member is placed at said first position; and
   focus detection control circuit means receiving the output of said photoelectric element, said circuit means including:
   a servomotor drivingly connected with said photographic optical lens system;

a drive circuit for driving said servomotor; and hold switching means provided in said drive circuit for electrically energizing and deenergizing said motor, said switching means being arranged to shift from its ON position to its OFF position in synchronism with the displacement of said mirror member from said first position to said second position.

2. A photographic camera according to claim 1, wherein said hold switching means comprises a switch mechanically linked with said mirror member.

3. A photographic camera according to claim 1, wherein said control circuit means further includes;

second hold switching means connected in said motor drive circuit arranged to permit interruption of said motor drive circuit only in a predetermined position of said photographic optical lens system;

a constant time limit circuit adapted to start timing in response to shutter release and to continue such timing for a predetermined time; and electromagnet means connected with the output of said time limit circuit, said electromagnet means being arranged to block the interruption of said motor drive circuit by said second hold switching means from the time of shutter release until said predetermined time thereafter, whereby when said photographic optical lens system next reaches its said predetermined position under drive of said motor, said second hold switching means is changed over from its ON position to its OFF position to electrically deenergize said motor.

4. A photographic camera according to claim 1, wherein said mirror member is a rotatable shutter.

5. A photographic camera according to claim 1, wherein said mirror is a vertically movable quick-return mirror.

6. A photographic camera according to claim 1, wherein said control circuit means further includes:

a switching circuit having the input thereof connected with said light receiving element; and a switch member adapted to be changed over by the output of said switching circuit, said switch member being connected in said motor drive circuit;

whereby said motor drive circuit is opened when said mirror member is in its second position.

7. A photographic camera according to claim 1, wherein said control circuit means further includes a switching circuit having the input thereof connected with said light-receiving element and a flipflop circuit adapted to be reset through the switching circuit when output of said light-receiving element reaches an extreme value thereof, and wherein, further, said servomotor is connected to be driven by the output of the flipflop circuit.

* * * * *